(12) United States Patent
Spickermann et al.

(10) Patent No.: US 9,298,000 B2
(45) Date of Patent: Mar. 29, 2016

(54) METHOD AND APPARATUS FOR BEAM STEERING

(75) Inventors: Ralph Spickermann, Redwood City, CA (US); Daniel A Tauber, Palo Alto, CA (US)

(73) Assignee: LOCKHEED MARTIN CORPORATION, Bethesda, MA (US)

( * ) Notice: Subject to any disclaimer, the term of this patent is extended or adjusted under 35 U.S.C. 154(b) by 310 days.

(21) Appl. No.: 13/555,642

(22) Filed: Jul. 23, 2012

(65) Prior Publication Data

US 2014/0021329 A1    Jan. 23, 2014

(51) Int. Cl.
*G02B 26/08* (2006.01)

(52) U.S. Cl.
CPC .................................. *G02B 26/0816* (2013.01)

(58) Field of Classification Search
CPC .............. G02B 26/08; G02B 26/0833; G02B 26/0816; G01J 20/0208; G01J 3/4537
USPC ........ 250/201.1, 221, 239, 203.2, 203.6, 216, 250/204, 205, 550; 359/223, 224, 225, 226, 359/290, 291; 356/510–514

See application file for complete search history.

(56) References Cited

U.S. PATENT DOCUMENTS

| 4,825,062 | A | * | 4/1989 | Rather et al. | 250/201.1 |
| 5,097,354 | A | * | 3/1992 | Goto | 359/212.1 |
| 5,256,869 | A | * | 10/1993 | Lin et al. | 250/201.9 |

* cited by examiner

*Primary Examiner* — Georgia Y Epps
*Assistant Examiner* — Don Williams
(74) *Attorney, Agent, or Firm* — Oblon, McClelland, Maier & Neustadt, L.L.P.

(57) ABSTRACT

Aspects of the disclosure provide an apparatus. The apparatus includes a mirror module having a plurality of individually controllable mirror segments to reflect an incident beam having a variable incidence angle, and a controller configured to determine deflection profiles of the individually controllable mirror segments, and provide control signals to the individually-controllable mirror segments to adjust the deflection profiles, such that the individually controllable mirror segments collectively reflect the incident beam in a predetermined direction.

20 Claims, 6 Drawing Sheets

METHOD AND APPARATUS FOR BEAM STEERING

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Optical applications can steer an optical beam to compensate for environmental disturbance, such as atmospheric turbulence, ambient vibration, and the like. In an example, an optical communication receiver in an aircraft may need to extremely rapidly actively steer a received optical beam to compensate for aircraft angular vibration and turbulent atmosphere surrounding the aircraft, in order to steadily couple the received optical beam to an optical fiber.

SUMMARY

Aspects of the disclosure provide an apparatus. The apparatus includes a mirror module having a plurality of individually controllable mirror segments to reflect an incident beam having a variable incidence angle, and a controller configured to determine deflection profiles of the individually controllable mirror segments, and provide control signals to the individually controllable mirror segments to adjust the deflection profiles, such that the individually controllable mirror segments collectively reflect the incident beam in a predetermined direction.

Further, in an embodiment, the apparatus includes a sensor configured to sense a direction error of at least one of the incident beam and the reflected beam, and provide the direction error to the controller. The controller is configured to determine the deflection profiles of the individually controllable mirror segments based on the direction error.

According to an aspect of the disclosure, each individually controllable mirror segment includes a mirror surface, and a first mechanical structure configured to move up and down the mirror surface to adjust a height of the mirror surface. Further, each individually controllable mirror segment includes a second mechanical structure configured to tilt the mirror surface.

In an example, the controller is configured to determine the heights of the plurality of individually controllable mirror segments according to a linear ramp configuration. In another example, the controller is configured to bound the heights of the plurality of individually controllable mirror segments within a range. For example, the controller is configured to adjust the heights by an integer times of one half of a wavelength of the incident beam to bound the heights within the range. In another example, the controller is configured to determine the heights of the plurality of individually controllable mirror segments according to a saw-tooth configuration.

Aspects of the disclosure provide a method for beam steering. The method includes determining deflection profiles for individually controllable mirror segments to steer an incident beam having a variable incidence angle to a predetermined direction, and providing control signals to the individually controllable mirror segments to adjust the deflection profiles.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
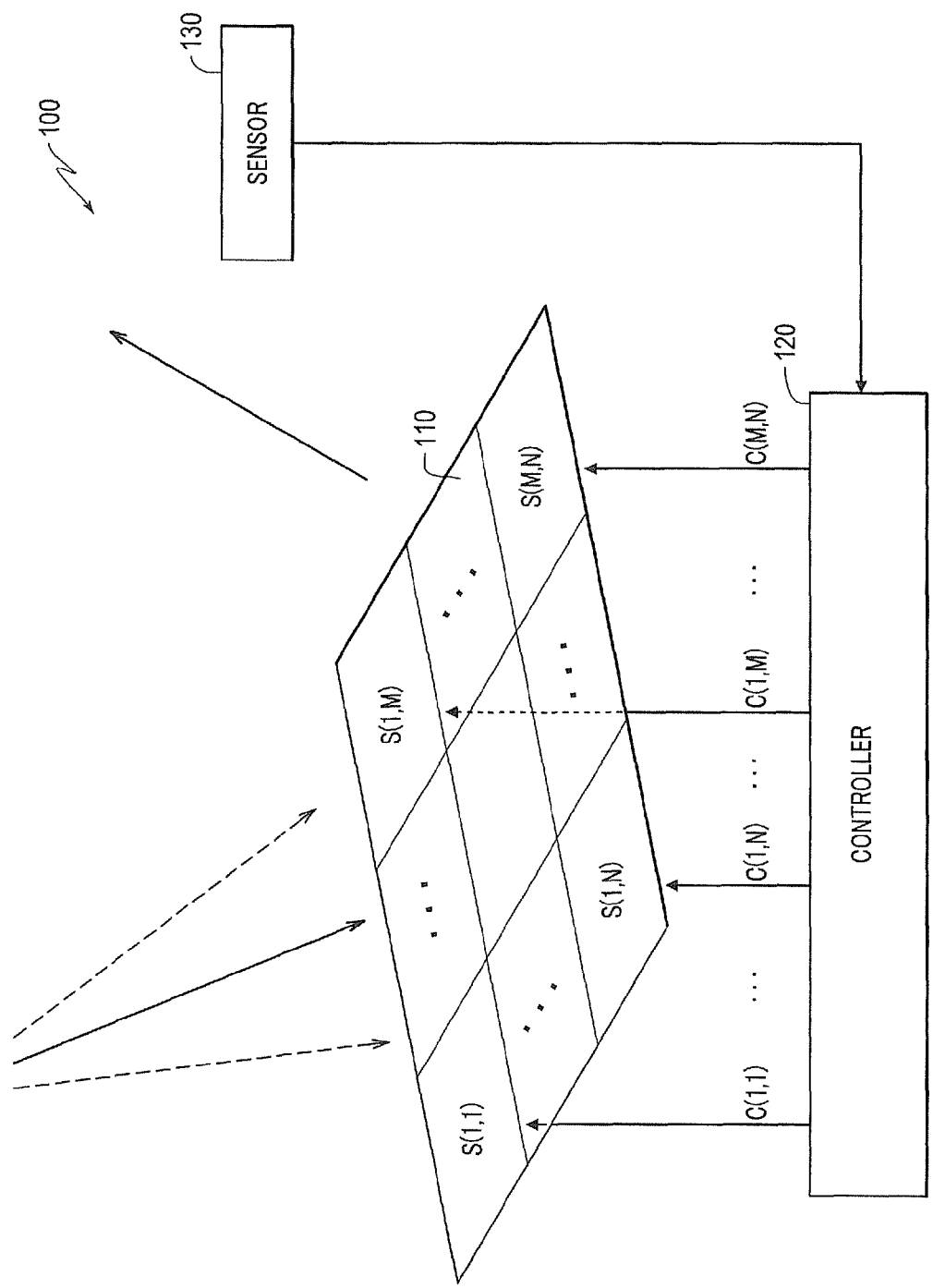
FIG. 1 shows a block diagram of an exemplary beam steering system according to an embodiment of the disclosure.

FIG. 1 shows a block diagram of an exemplary beam steering system 100 according to an embodiment of the disclosure. The beam steering system 100 includes a mirror module 110, a controller 120, and a sensor 130. These elements are coupled together as shown in FIG. 1.

The mirror module 110 can include a plurality of segmented mirrors that are individually controllable. In the FIG. 1 example, the mirror module 110 includes M×N mirror segments S(1,1) to S(M, N) arranged in an array (M and N are positive integers). In an example, each of the mirror segments is individually controllable. It is also noted that, in another example, two or more neighboring mirror segments are grouped together, and each group is individually controllable.

According to an aspect of the disclosure, the mirror module 110 is implemented using a micro-electro-mechanical system (MEMS). In an example, the mirror module 110 is implemented on a one-centimeter by one-centimeter silicon chip. The mirror module 110 on chip can be manufactured by mass production using a silicon wafer, for example.

According to an embodiment of the disclosure, a mirror segment includes a mirror surface, and a mechanical structure that is electronically controllable. The mechanical structure is electronically controlled to adjust a deflection profile of the mirror surface. It is noted that the mechanical structure can be any suitable mechanical structure that causes any suitable deflection change of the mirror surface. In an example, a mechanical structure moves up and down the mirror surface to change a height of the mirror surface. In another example, a mechanical structure tilts the mirror surface to a suitable tilt angle. In another example, a mirror segment includes a first mechanical structure that moves up and down the mirror surface, and a second mechanical structure that tilts the mirror surface.

Further, in an embodiment, a mirror segment also includes suitable electronic circuit components to control the mechanical structure. In an example, the electronic circuit components are integrated with the mirror surfaces and the mechanical structures on the same chip. In another example, the electronic circuit components are on a different chip and are suitably coupled to the mechanical structures.

The controller 120 determines deflection profiles for the plurality of mirror segments, and provides control signals, such as C(1,1) to C(M,N), to configure the plurality of mirror segments to have the deflection profiles. In an embodiment, the controller 120 provides individual control signals to the mirror segments. In an example, the controller 120 provides individual height control signals to the mirror segments to respectively move up and down the mirror surfaces. In another example, the controller 120 provides individual tilt control signals to the mirror segments to respectively tilt the mirror surfaces, and provides individual height control signals to the mirror segments to respectively move up and down the mirror surfaces. In another example, the controller 120 provides a tilt signal to all the mirror segments to tilt the mirror surface in a same manner, and provides respective height control signals to the mirror segments to respectively move up and down the mirror surfaces.

In an embodiment, the controller 120 is implemented as logic circuits, such as analog and digital circuits, to determine the deflection profiles. In another embodiment, the controller 120 is implemented as a processor executing code instructions to determine the deflection profiles. According to an aspect of the disclosure, the controller 120 can be integrated with the mirror module 110 on the same chip, or the controller 120 can be implemented on a different chip and is suitably coupled to the mirror module 110.

The sensor 130 senses properties of the incident optical beam to the mirror module 110 or the reflected optical beam from the mirror module 110. Based on the beam properties, the sensor 130 detects a beam property variation from a desired beam property. In an embodiment, the sensor 130 detects an incidence angle variation of the incident optical beam from a nominal incidence angle. In another embodiment, the sensor 130 detects a reflection angle variation of the reflected optical beam from a desired reflection angle, such as in a direction to an optical fiber.

According to an aspect of the disclosure, the controller 120 receives the beam property variation from the sensor 130, determines the deflection profiles for the plurality of mirror segments based on the beam property variation, and provides the control signals to the mirror module 110 to adjust the deflection profiles to compensate for the beam property variation. According to the control signals, the mechanical structures respectively change the deflection profiles of the plurality of the mirror segments. Then, the plurality of mirror segments collectively compensates for the beam property variation, and reflects the incident beam with the desired beam property.

In an embodiment, the beam steering system 100 is configured to actively steer an incident optical beam having a variable incidence angle, such that a reflected optical beam has a substantially stable reflection angle. In an example, the beam steering system 100 is used for a free-space optical communication application on a mobile platform, such as an aircraft, and the like. The beam steering system 100 steers a received optical beam to a receiving optical fiber. Due to aircraft angular vibration and turbulent atmosphere layer surrounding the aircraft, the received optical beam fluctuates, and causes incidence angle fluctuation with regard to the receiving optical fiber. According to an aspect of the disclosure, the incidence angle fluctuation may have a frequency about 10 KHz. In an embodiment, the beam steering system 100 is configured to steer the received optical beam fast enough in response to the incidence angle fluctuation to couple the received optical beam into the receiving optical fiber.

In another example, the beam steering system 100 is used in a field operation when mechanical isolation equipment, such as a pneumatically damped mechanical isolation table, is not available. In the field operation, ambient vibration may induce relative motion of optical elements in an optical system. The beam steering system 100 is used to compensate for the ambient vibration to ensure relatively high precision optical beam alignment.

Specifically, in an embodiment, an incident optical beam to the beam steering system 100 has incidence angle fluctuation in the order of 10 KHz, for example. The sensor 130, the controller 120, and the mirror module 110 form a feedback loop that is able to respond to the incidence angle fluctuation, and to stabilize the reflected optical beam.

In an example, when the incidence angle fluctuation causes a shift of the reflection angle from a desired angle in the direction of the receiving optical fiber. The sensor 130 detects the reflection angle variation, and provides the detected reflection angle variation to the controller 120. In an example, the sensor 130 is a simple quad cell or other fast device that can detect beam angle error at a rapid sample speed, such as a very rapid beam angle error sample rate of 100 KHz or greater, to support the 10 KHz stabilization rate. Then, the controller 120 determines deflection profiles for the plurality of mirror segments in the mirror module 110, and provides control signals to the mirror module 110. According to the control signals, the mechanical structures of the mirror module 110 adjust the deflection profiles of the mirror surfaces. The deflection profiles adjustment of the mirror surfaces collectively compensates for the incidence angle fluctuation. According to an aspect of the disclosure, the mirror surfaces collectively emulate a flat mirror surface to compensate for the incidence angle fluctuation. Due to the relatively low mass of the individual mirror surface, MEMS implemented mechanical structures can respond and adjust the deflection profiles of the mirror surfaces at a relatively high speed, such as in the order of 20-50 KHz. Then, the feedback loop can operate in response to the incidence angle fluctuation of the 10 KHz frequency.

In a single flat mirror surface example, due to the relatively large mass of the single flat mirror, a mechanical structure that adjusts the tilting angle of the single flat mirror has a upper frequency limitation in the order of 500 Hz. Thus, the single flat mirror is not suitable to stabilize a beam having incidence angle fluctuation in the order of 10 KHz.

It is noted that the beam steering system 100 may apply any suitable configuration, such as a linear ramp configuration, a saw tooth configuration, and the like to the mirror module 110 to achieve the desire beam properties of the reflected optical beam.

Figure 2:
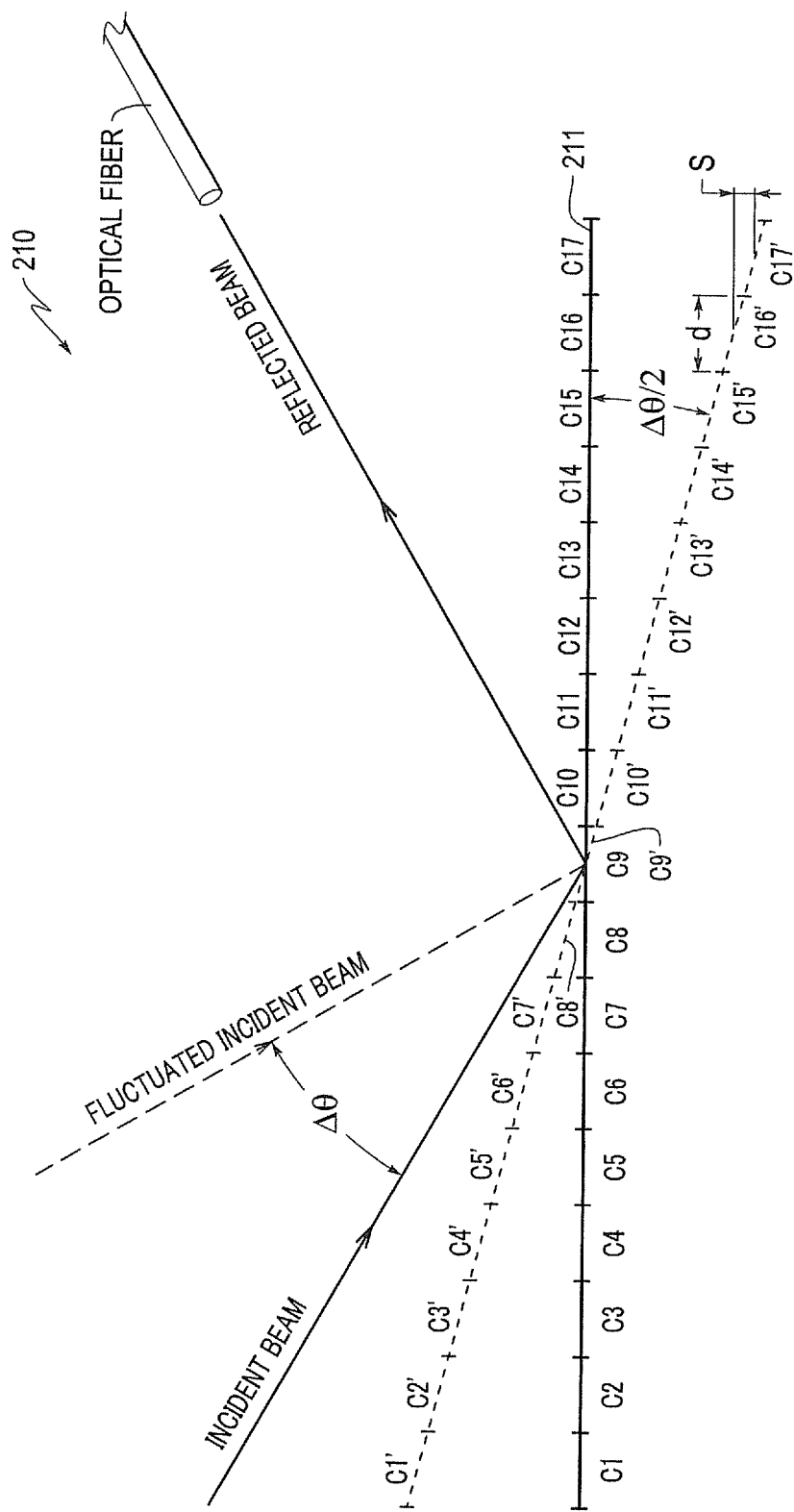
FIG. 2 shows an exemplary beam steering configuration according to an embodiment of the disclosure.

FIG. 2 shows an exemplary mirror module 210 according to an embodiment of the disclosure. The mirror module 210 includes a plurality of mirror segments that are individually controllable. The plurality of mirror segments is lined up in a direction, such as X-axis direction, Y-axis direction, and the like. Each mirror segment includes a mirror surface 211, and mechanical structures (not shown) to change deflection profile of the mirror surface. In an embodiment, each mirror segment includes a first mechanical structure (not shown) to tilt the mirror surface, and a second mechanical structure (not shown) to move up and down the mirror surface.

In the FIG. 2 example, the mirror module 210 is configured to emulate a flat mirror surface in a linear ramp configuration. For example, the first mechanical structures are controlled to tilt the mirror surfaces of the same angle, and the second mechanical structures are controlled to move up and down the mirror surfaces in a linear ramp manner, such that the mirror surfaces are aligned into an emulated flat surface.

For example, when the incident beam does not fluctuate, the mirror surfaces 211 respectively have the deflection profiles C1-C17. Specifically, the mirror surfaces 211 have substantially zero tilting angles, and substantially same height. The mirror surfaces 211 having the deflection profiles C1-C17 emulate a flat mirror surface with zero tilting angle to collectively reflect the incident beam, and direct the reflected beam into a desired direction, such as an optical fiber direction.

Further, when the incident beam fluctuates, the mirror surfaces 211 change the deflection profiles to emulate a tilted mirror surface to collectively reflect the fluctuated incident beam, and direct the reflected beam into the desired direction. For example, when the incident beam angle shifts by Δθ, the deflection profiles of the mirror surfaces 211 are change to the C1'-C17' respectively. According to the deflection profiles C1'-C17', each of the mirror surface 211 tilts by about Δθ/2. In addition, the mirror surfaces 211 move up and down to align the tilted mirror surfaces to emulate a tilted flat mirror surface. In an example, when mirror surfaces 211 have the same pitch d, the height difference s between neighboring mirror surfaces 211 can be calculated by Eq. 1:

$$s = \tan\left(\frac{\Delta\theta}{2}\right) \times d \qquad \text{Eq. 1}$$

Further, when Δθ is very small, the height difference s can be calculated by Eq. 2:

$$s \approx \frac{\Delta\theta}{2} \times d \qquad \text{Eq. 2}$$

The mirror surfaces 211 with the deflection profiles C1'-C17' emulate a flat mirror surface with Δθ/2 tilting angle to collectively reflect the incident beam, and direct the reflected beam into the desired direction.

It is noted that, in another embodiment, the mirror module 210 does not include the mechanical structures to tilt the mirror surfaces 211. Thus, the mirror surfaces 211 move up and down in the linear ramp configuration, but the mirror surfaces 211 do not tilt.

Figure 3:
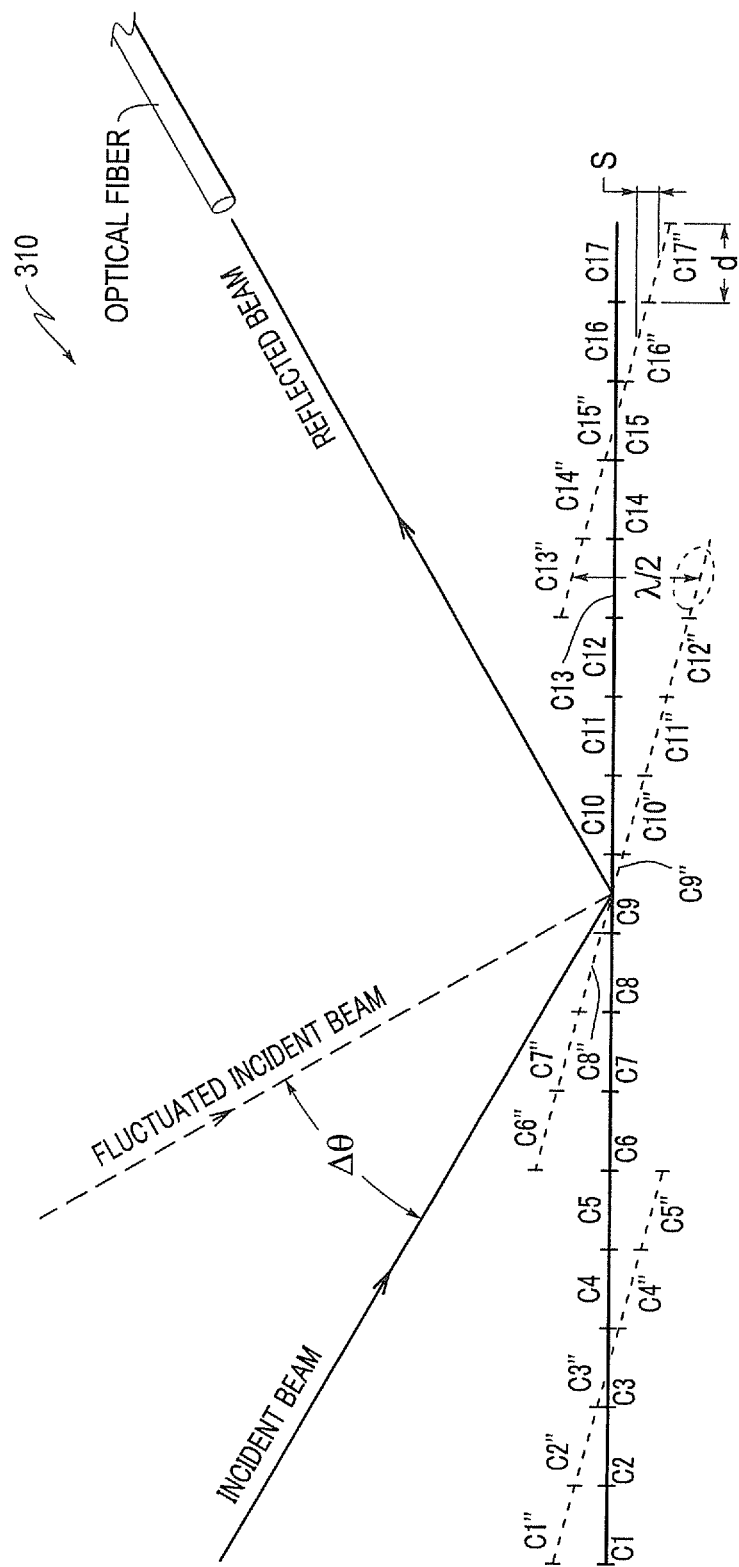
FIG. 3 shows another exemplary beam steering configuration according to an embodiment of the disclosure.

FIG. 3 shows another exemplary mirror module 310 according to an embodiment of the disclosure. Similarly to the mirror module 210, the mirror module 310 includes a plurality of mirror segments that are individually controllable. Each mirror segment includes a mirror surface and mechanical structures to change deflection profile of the mirror surface. In an embodiment, each mirror segment includes a first mechanical structure to tilt the mirror surface, and a second mechanical structure to move up and down the mirror surface.

In the FIG. 3 example, the mirror module 310 is configured to emulate a flat mirror surface in a saw-tooth configuration. For example, the first mechanical structures are controlled to tilt the mirror surfaces of the same angle, and the second mechanical structures are controlled to move up and down the mirror surfaces in a saw-tooth pattern.

In an example, the incident beam has a pre-known wavelength λ. When the incident beam does not fluctuate, the mirror surfaces respectively have the deflection profiles C1-C17. Specifically, the mirror surfaces have substantially zero tilting angles, and substantially same height. The mirror surfaces having the deflection profiles C1-C17 emulate a flat mirror surface with zero tilting angle to collectively reflect the incident beam, and direct the reflected beam into a desired direction, such as an optical fiber direction.

Further, when the incident beam fluctuates, the mirror surfaces change the deflection profiles to emulate a tilted mirror surface to collectively reflect the fluctuated incident beam, and direct the reflected beam into the desired direction. For example, when the incident beam shifts by Δθ, the mirror surfaces respectively change to the deflection profiles C1"-C17". According to the deflection profiles C1" to C17", each of the mirror surface tilts by Δθ/2. In addition, the mirror surfaces move up and down to align the tilted mirror surfaces in the saw-tooth pattern, such that the heights of the mirror surfaces are bounded in a relatively small range, such as within [-λ/4, λ/4]. The bounded range enables the deflection profile change to be performed with a relatively high speed.

In an example, when mirror surfaces have the same pitch d, the height difference s between neighboring mirror surfaces can be calculated by Eq. 1. Further, when Δθ is very small, the height difference s can be calculated by Eq. 2. In addition, when a height of a mirror surface is out of the range, the height is shifted into the range by adding or subtracting multiple of λ/2. In an example, the height of the mirror surfaces is bounded in the range of [-λ/4, +λ/4]. When the height of C13" is smaller than -λ/4, the height is shifted into the range by adding λ/2.

Thus, the mirror surfaces having the deflection profiles C1"-C17" emulate a flat mirror surface with Δθ/2 tilting angle in the saw-tooth configuration to collectively reflect the incident beam, and direct the reflected beam into the desired direction.

It is noted that, in another embodiment, the mirror module 310 does not include the mechanical structures to tilt the mirror surfaces 311. Thus, the mirror surfaces move up and down in the saw-tooth pattern, and do not tilt by Δθ/2.

It is also noted that, for ease and simplicity, FIG. 2 and FIG. 3 show incident angle fluctuates in one direction, such as X-axis or Y-axis. When the incident angle fluctuates in both X-axis and Y-axis, the height can be calculated as a sum of a first height due to the incident angle fluctuates in the X-axis, and a second height due to the incident angle fluctuates in the Y-axis.

Figure 4:
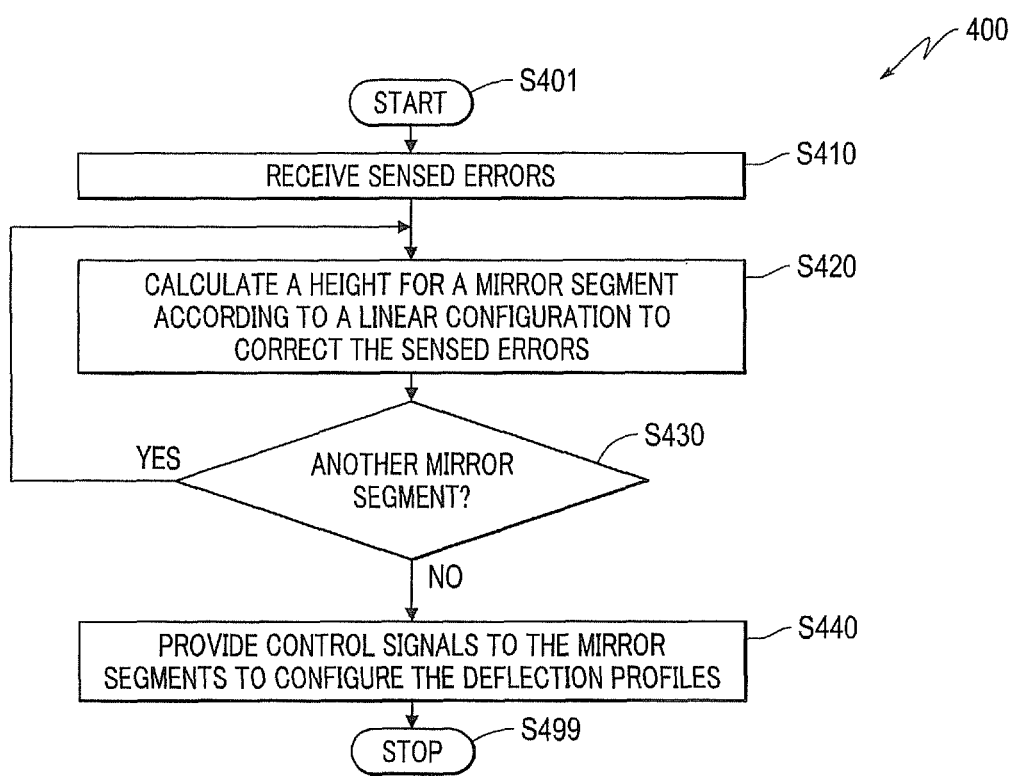
FIG. 4 shows a flowchart outlining a process example according to an embodiment of the disclosure.

FIG. 4 shows a flowchart outlining a process example executed by a controller, such as the controller 120, according to an embodiment of the disclosure. The process starts at S401, and proceeds to S410.

At S410, the controller 120 receives angle errors sensed by the sensor 130. In an embodiment, the angle errors are due to the angle variation of the incidence beam. In an example, the sensor 130 is configured to sense a first angle error ($\Delta\theta_X$) from a desired angle in the X-axis and a second angle error ($\Delta\theta_Y$) from a desired angle in the Y-axis, and provides the first angle error and the second angle error to the controller 120. According to an aspect of the disclosure, the sensor 130 senses the incident beam to detect the errors. According to another aspect of the disclosure, the sensor senses the reflected beam to detect the errors.

At S420, the controller 120 calculates a height (H) for a mirror segment S(i,j) according to a linear ramp configuration to correct the angle errors. In an embodiment, the controller 120 calculates a first height component ($H_X$) to correct the angle error in the X-axis, and calculates a second height component ($H_Y$) to correct the angle error in the Y-axis. Then, the controller 120 sums up the first height component and the second height component.

Specifically, in an example, the controller 120 calculates a first height ramp component ($s_X$) between neighboring mirror segments in the X-axis, and a second height ramp component ($s_Y$) between neighboring mirror segments in the Y-axis according to Eq. 3 and Eq. 4:

$$s_X \approx \frac{\Delta\theta_X}{2} \times d \qquad \text{Eq. 3}$$

$$s_Y \approx \frac{\Delta\theta_Y}{2} \times d \qquad \text{Eq. 4}$$

Then, assuming that the center mirror segment $S(i_{CENTER}, j_{CENTER})$ keeps the same height, the first height component and the second height component for the mirror segment $S(i,j)$ can be calculated according to Eq. 5 and Eq. 6:

$$H_X = s_X \times (i - i_{CENTER}) \quad \text{Eq. 5}$$

$$H_Y = s_Y \times (j - j_{CENTER}) \quad \text{Eq. 6}$$

Then, the height (H) for the mirror segment $S(i,j)$ is a sum of $H_X$ and $H_Y$.

At S430, the controller 120 determines whether it needs to calculate the height for another mirror segment. When the controller finished calculation for all the mirror segments, the process proceeds to S440; otherwise, the process returns to S420 to calculate the height for another mirror segment.

At S440, the controller 120 provides the control signals to the mirror segments to configure the deflection profiles according to the calculated heights for the mirror segments. Then, the process proceeds to S499 and terminates.

It is noted that the process 400 can be suitably modified. In an example, the sensor 130, the controller 120, and the mirror module 110 form a feedback loop. Then, at S440, the process returns to S410. In another example, at S440, the controller 120 also provides a tilt signal to the mirror segments to tilt the mirror surfaces.

Figure 5:
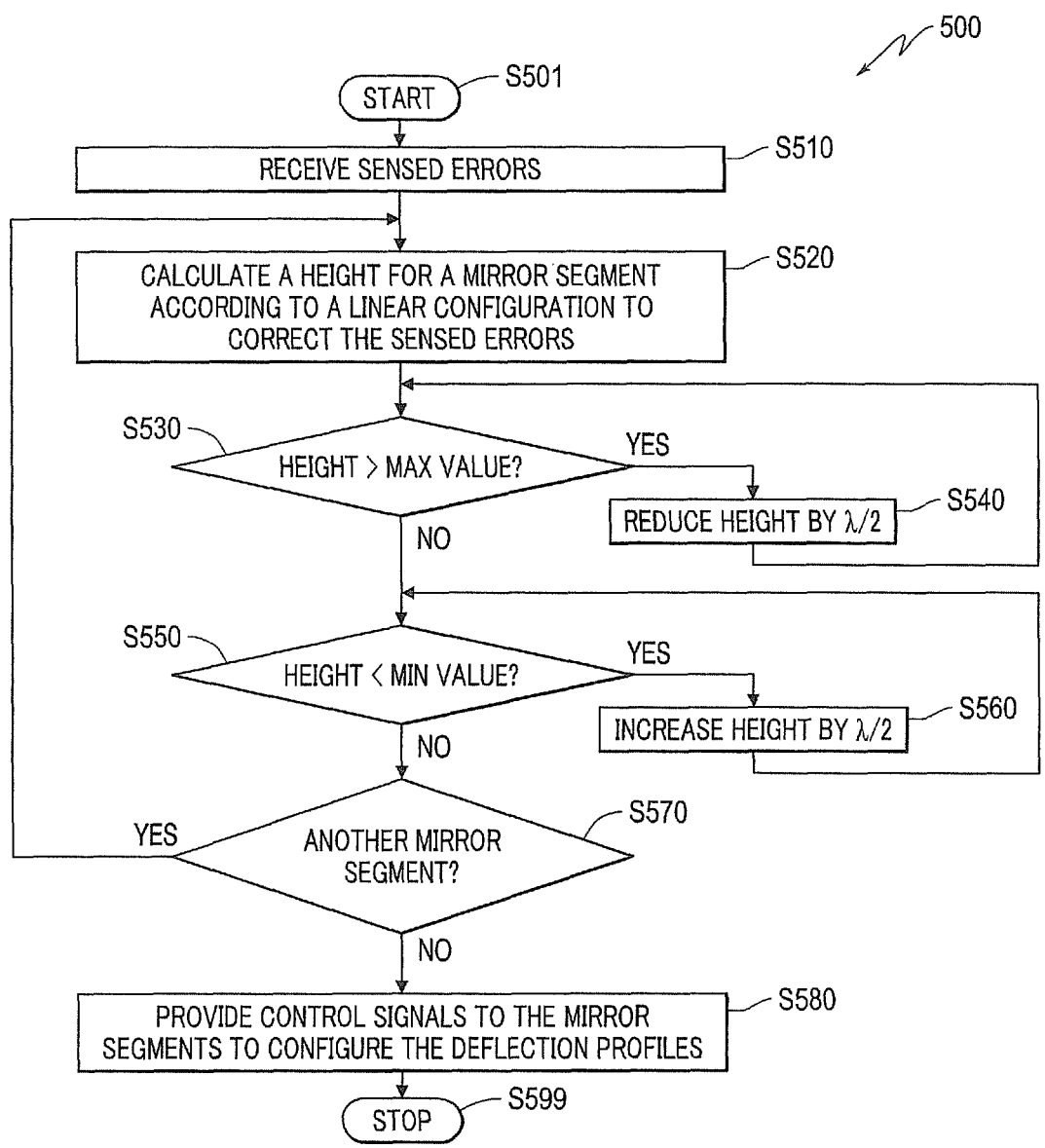
FIG. 5 shows a flowchart outlining another exemplary process according to an embodiment of the disclosure.

FIG. 5 shows a flowchart outlining another process example executed by a controller, such as the controller 120, according to an embodiment of the disclosure. The process starts at S501, and proceeds to S510.

At S510, the controller 120 receives angle errors sensed by the sensor 130. In an embodiment, the angle errors are due to the angle variation of the incidence beam. In an example, the sensor 130 is configured to sense a first angle error ($\Delta\theta_X$) from a desired angle in the X-axis and a second angle error ($\Delta\theta_Y$) from a desired angle in the Y-axis, and provides the first angle error and the second angle error to the controller 120. According to an aspect of the disclosure, the sensor 130 senses the incident beam to detect the errors. According to another aspect of the disclosure, the sensor senses the reflected beam to detect the errors.

At S520, the controller 120 calculates a height (H) for a mirror segment $S(i,j)$ according to a linear ramp configuration to correct the angle errors. In an embodiment, the controller 120 calculates a first height component ($H_X$) to correct the angle error in the X-axis, and calculates a second height component ($H_Y$) to correct the angle error in the Y-axis. Then, the controller 120 sums up the first height component and the second height component.

Specifically, in an example, the controller 120 calculates a first height ramp component ($s_X$) between neighboring mirror segments in the X-axis, and a second height ramp component ($S_Y$) between neighboring mirror segments in the Y-axis according to Eq. 3 and Eq. 4. Then, assuming that the center mirror segment $S(i_{CENTER}, j_{CENTER})$ keeps the same height, the first height component and the second height component for the mirror segment $S(i,j)$ can be calculated according to Eq. 5 and Eq. 6. Then, the height (H) for the mirror segment $S(i,j)$ is a sum of $H_X$ and $H_Y$.

At S530, the controller 120 determines whether the height is larger than a maximum value. When the height is larger than the maximum value, the process proceeds to S540; otherwise, the process proceeds to S550.

At S540, the controller 120 reduces the height by one half of the wavelength of the incidence beam. Then, the process returns to S530.

At S550, the controller 120 determines whether the height is smaller than a minimum value. When the height is smaller than the minimum value, the process proceeds to S560; otherwise, the process proceeds to S570.

At S560, the controller 120 increases the height by one half of the wavelength of the incidence beam. Then, the process returns to S550.

At S570, the controller 120 determines whether it needs to calculate the height for another mirror segment. When the controller finished calculation for all the mirror segments, the process proceeds to S580; otherwise, the process returns to S520 to calculate the height for another mirror segment.

At S580, the controller 120 provides the control signals to the mirror segments to configure the deflection profiles according to the calculated heights for the mirror segments. Then, the process proceeds to S599 and terminates.

It is noted that the process 500 can be suitably modified. In an example, the sensor 130, the controller 120, and the mirror module 110 form a feedback loop. Then, at S580, the process returns to S510. In another example, at S580, the controller 120 also provides a tilt signal to the mirror segments to tilt the mirror surfaces.

Figure 6:
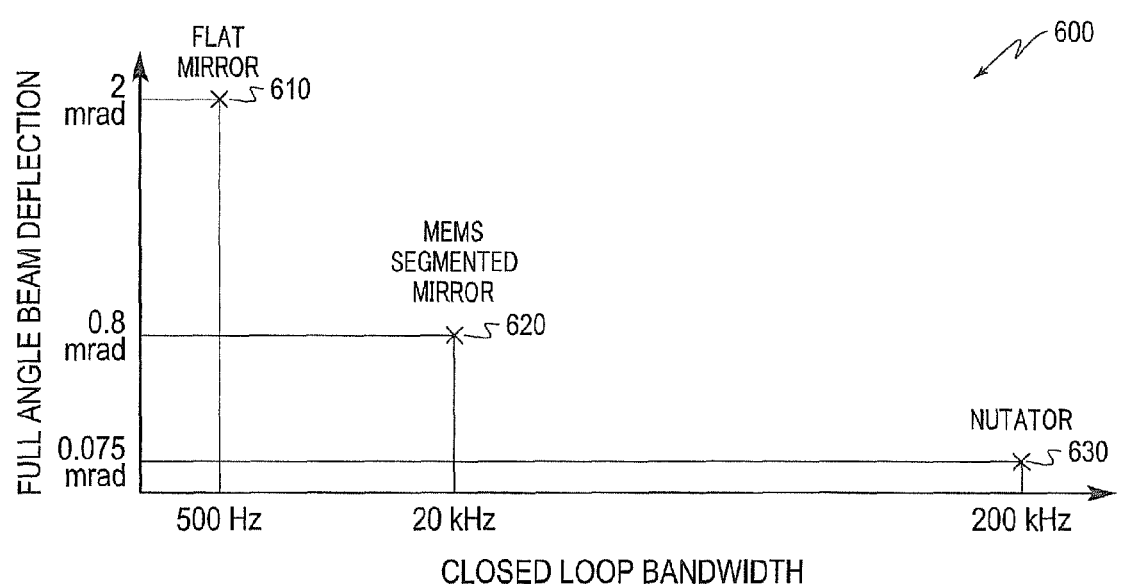
FIG. 6 shows a plot 600 comparing three steering apparatuses.

FIG. 6 shows a plot 600 comparing angle limit and bandwidth limit of a flat mirror 610, a MEMS segmented mirror 620 and a nutator 630. The flat mirror has the largest deflection angle, but smallest bandwidth. The MEMS segmented mirror has relatively large deflection angle compared to the nutator, and relatively large bandwidth compared to the flat mirror. The nutator has the largest bandwidth but the smallest deflection angle.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An apparatus, comprising
   a mirror module having a plurality of individually controllable mirror segments to reflect an incident beam having a variable incidence angle; and
   a controller configured to determine deflection profiles of the individually-controllable mirror segments, and provide control signals to the individually controllable mirror segments to adjust the deflection profiles, such that the individually controllable mirror segments collectively reflect the incident beam in a predetermined direction, the deflection profiles emulating a flat mirror surface, tilting each of the mirror segments by $\Delta\Theta/2$ when the incident beam angle shifts by $\Delta\Theta$ for emulating the flat mirror surface, and aligning the tilted mirror segments by adjusting height differences S between neighboring mirror surfaces of the tilted mirror segments having the same pitch d to satisfy $S = \tan(\Delta\theta/2) \times d$.

2. The apparatus of claim 1, further comprising:
   a sensor configured to sense a direction error of at least one of the incident beam and the reflected beam, and provide the direction error to the controller; and
   the controller is configured to determine the deflection profiles of the individually controllable mirror segments based on the direction error.

3. The apparatus of claim 1, wherein each individually controllable mirror segment includes a mirror surface, and a first mechanical structure configured to move up and down the mirror surface to adjust a height of the mirror surface.

4. The apparatus of claim 3, wherein the individually controllable mirror segment includes a second mechanical structure configured to tilt the mirror surface.

5. The apparatus of claim 3, wherein the controller is configured to determine the heights of the plurality of individually controllable mirror segments according to a linear ramp configuration.

6. The apparatus of claim 5, wherein the controller is configured to determine a height of a mirror segment based on a location of the mirror segment.

7. The apparatus of claim 3, wherein the controller is configured to bound the heights of the plurality of individually controllable mirror segments within a range.

8. The apparatus of claim 7, wherein the controller is configured to determine the heights of the plurality of individually controllable mirror segments according to a saw-tooth configuration.

9. The apparatus of claim 3, wherein the controller is configured to adjust the heights by an integer times of one half of a wavelength of the incident beam to bound the heights within the range.

10. The apparatus of claim 1, wherein the mirror module is implemented using a micro-electro-mechanical system (MEMS).

11. The apparatus of claim 1, wherein each individually controllable mirror segment is configured to adjust the deflection profile at a rate in the order of 20 KHz.

12. A method for beam steering, comprising:
determining deflection profiles for individually controllable mirror segments to steer an incident beam having a variable incidence angle in a predetermined direction;
providing control signals to the individually controllable mirror segments to adjust the deflection profiles, the deflection profiles emulating a flat mirror surface;
tilting each of the mirror segments by $\Delta\theta/2$ when the incident beam angle shifts by $\Delta\theta$ for emulating the flat mirror surface; and
aligning the tilted mirror segments by adjusting height differences S between neighboring mirror surfaces of the tilted mirror segments having the same pitch d to satisfy $S=\tan(\Delta\theta/2)\times d$.

13. The method of claim 12, further comprising:
receiving a direction error of at least one of the incident beam and the reflected beam; and
determining the deflection profiles of the individually controllable mirror segments based on the direction error.

14. The method of claim 12, wherein determining the deflection profiles for individually-controllable mirror segments to steer the incident beam further comprises:
determining heights for individually controllable mirror segments to steer the incident beam.

15. The method of claim 14, further comprising:
determining the heights of the plurality of individually controllable mirror segments according to a linear ramp configuration.

16. The method of claim 14, further comprising:
bounding the heights of the plurality of individually controllable mirror segments within a range.

17. The method of claim 16, further comprising:
adjusting the heights by an integer times of one half of the incident beam wavelength to bound the heights within the range.

18. The method of claim 14, further comprising
determining a height for a mirror segment based on a location of the mirror segment.

19. The method of claim 12, further comprising:
determining a tilt angle for individually-controllable mirror segments to steer the incident beam.

20. The method of claim 19, further comprising:
determining the heights of the plurality of individually controllable mirror segments according to a saw-tooth configuration.

* * * * *